United States Patent
Lefebvre et al.

(10) Patent No.: US 9,551,281 B2
(45) Date of Patent: Jan. 24, 2017

(54) ELECTRIC PROBE ASSEMBLY, GAS TURBINE ENGINE HAVING SAME AND METHOD OF COOLING SAME

(71) Applicant: Pratt & Whitney Canada Corp., Longueuil (CA)

(72) Inventors: Guy Lefebvre, St-Bruno de Montarville (CA); John Pietrobon, Outremont (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 439 days.

(21) Appl. No.: 14/155,702

(22) Filed: Jan. 15, 2014

(65) Prior Publication Data

US 2015/0198091 A1   Jul. 16, 2015

(51) Int. Cl.
*F02C 7/12* (2006.01)
*F01D 17/24* (2006.01)

(52) U.S. Cl.
CPC .............. *F02C 7/12* (2013.01); *F01D 17/24* (2013.01); *F05D 2270/80* (2013.01)

(58) Field of Classification Search
CPC .............. F02C 3/145; F02C 7/32; F02C 7/12; F01D 17/24; F01D 19/00; F01D 21/003; F01D 21/02; F01D 21/14; F01D 21/00; F05D 2270/80; F05D 2270/08; F05D 2270/304; F05D 2270/02; F05D 2270/021
USPC .............................. 415/118; 416/61
See application file for complete search history.

(56) References Cited

U.S. PATENT DOCUMENTS

| | | | | |
|---|---|---|---|---|
| 3,088,278 A | * | 5/1963 | Franz | F02C 3/145 415/126 |
| 3,451,268 A | * | 6/1969 | Meador | G01K 1/12 374/144 |
| 3,596,518 A | * | 8/1971 | Kirkpatrick | G01K 13/02 374/134 |
| 5,201,227 A | | 4/1993 | Iinuma et al. | |
| 5,718,512 A | * | 2/1998 | Ngo-Beelmann | G01K 13/02 136/230 |
| 7,225,626 B2 | | 6/2007 | Robinson et al. | |
| 7,743,600 B2 | * | 6/2010 | Babu | F01D 17/02 60/39.08 |
| 8,992,081 B2 | * | 3/2015 | Ireland | G01K 13/028 374/144 |
| 2007/0233415 A1 | * | 10/2007 | Babu | F01D 17/02 702/127 |
| 2011/0317740 A1 | * | 12/2011 | Ireland | G01K 13/028 374/179 |

* cited by examiner

*Primary Examiner* — David Bryant
*Assistant Examiner* — Lawrence Averick
(74) *Attorney, Agent, or Firm* — Norton Rose Fulbright Canada LLP

(57) ABSTRACT

A gas turbine engine comprises a hot section module which includes at least one electric probe assembly surrounded by an immediate environment having a local ambient temperature. The at least one electric probe assembly includes an electric probe having a probe body, and a conduit surrounding at least a portion of the probe body. In operation, the conduit carries a fluid flowing at a temperature lower than the local ambient temperature. The at least portion of the probe body is embedded in the fluid inside the conduit. The fluid thermally insulates the probe body from the local ambient temperature of the immediate environment around the at least one electric probe assembly.

16 Claims, 3 Drawing Sheets

ELECTRIC PROBE ASSEMBLY, GAS TURBINE ENGINE HAVING SAME AND METHOD OF COOLING SAME

TECHNICAL FIELD

The application relates generally to electric probes in high temperature sections of gas turbine engines.

BACKGROUND OF THE ART

A gas turbine engine includes sections at low temperatures, namely cold section modules, and sections at high temperatures, namely hot section module. The cold section module includes for example the compressor, while the hot section module includes for example, the combustion chamber and the turbine. While mechanical component may sustain the high temperatures of the hot section module, electric probes may not sustain these high temperatures, and their functioning could be altered by the hot ambient air of the hot section module.

SUMMARY

In one aspect, there is provided a gas turbine engine comprising: a hot section module including: at least one electric probe assembly surrounded by an immediate environment having a local ambient temperature, the at least one electric probe assembly including: an electric probe having a probe body; and a conduit surrounding at least a portion of the probe body, in operation, the conduit carrying a fluid flowing at a temperature lower than the local ambient temperature, the at least portion of the probe body being embedded in the fluid inside the conduit, the fluid thermally insulating the probe body from the local ambient temperature of the immediate environment around the at least one electric probe assembly.

In another aspect, there is provided an electric probe assembly for use in an environment having a local ambient temperature immediately around the probe assembly, the assembly comprising: an electric probe having a probe body having a first radial dimension; and a conduit having a second radial dimension larger than the first radial dimension, the conduit containing at least a portion of the probe body, the conduit being adapted to carry a fluid flowing at a temperature lower than the local ambient temperature immediately around the probe assembly, the at least portion of the probe body being embedded in the fluid, the fluid thermally insulating the at least portion of the probe body from the local ambient temperature In a further aspect, there is provided a method of cooling an electric probe in a hot section module of a gas turbine engine, the method comprising: carrying a fluid at a temperature lower than a local ambient temperature immediately around the electric probe in a conduit surrounding at least a portion of the electric probe with the fluid; and thermally insulating the portion of the electric probe from the local ambient temperature as a result of carrying the fluid in the conduit surrounding at least a portion of the electric probe with the fluid.

DESCRIPTION OF THE DRAWINGS

Reference is now made to the accompanying figures in which.

DETAILED DESCRIPTION

Figure 1:
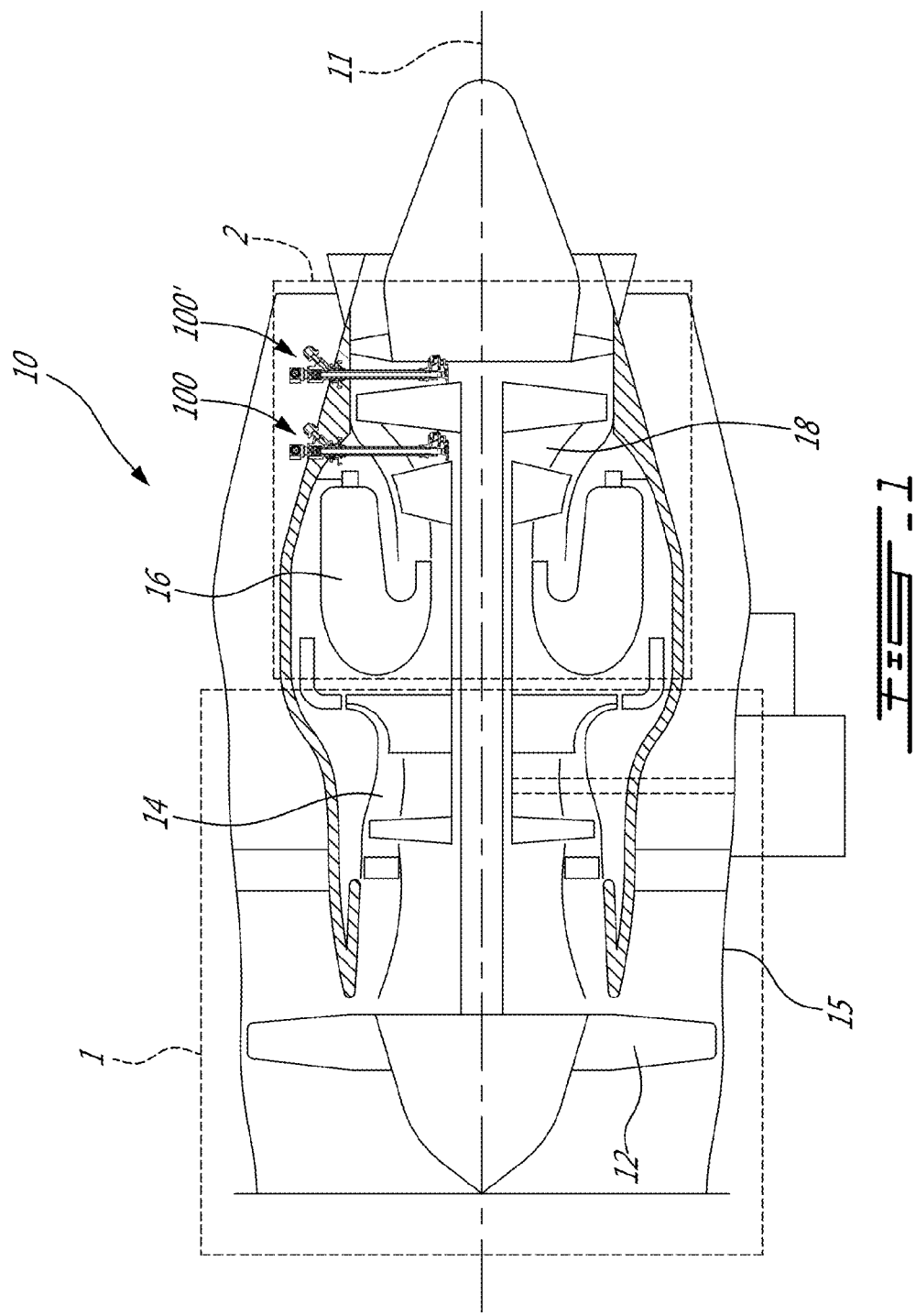
FIG. 1 is a schematic cross-sectional view of a gas turbine engine.

FIG. 1 illustrates a gas turbine engine 10 of a type preferably provided for use in subsonic flight, generally comprising within an engine case 15 and extending along a longitudinal axis 11. The engine 10 includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The engine 10 includes a cold section module 1 (generally contained in the dashed area 1) that is under a relatively cold ambient temperature. The cold section module 1 includes the fan 12 and compressor section 14. The engine 10 also includes a hot section module 2 (generally contained in the dashed area 2) that is under a relatively hot ambient temperature. The hot section module 2 includes the combustor 16 and the turbine section 18. The engine 10 further includes an oil system (not shown) that conveys oil to different parts of the engine for lubrication. Examples of such parts include bearings and gearboxes. Two electrical probes 100 and 100' are disposed inside the turbine section 18 of the hot section module 2. The electrical probe assemblies 100 and 100' being similar only the electrical probe assembly 100 will be described herein. The electrical probe assembly 100 is designed to sustain the relatively high local ambient temperature of the hot section module 2.

Figure 2:
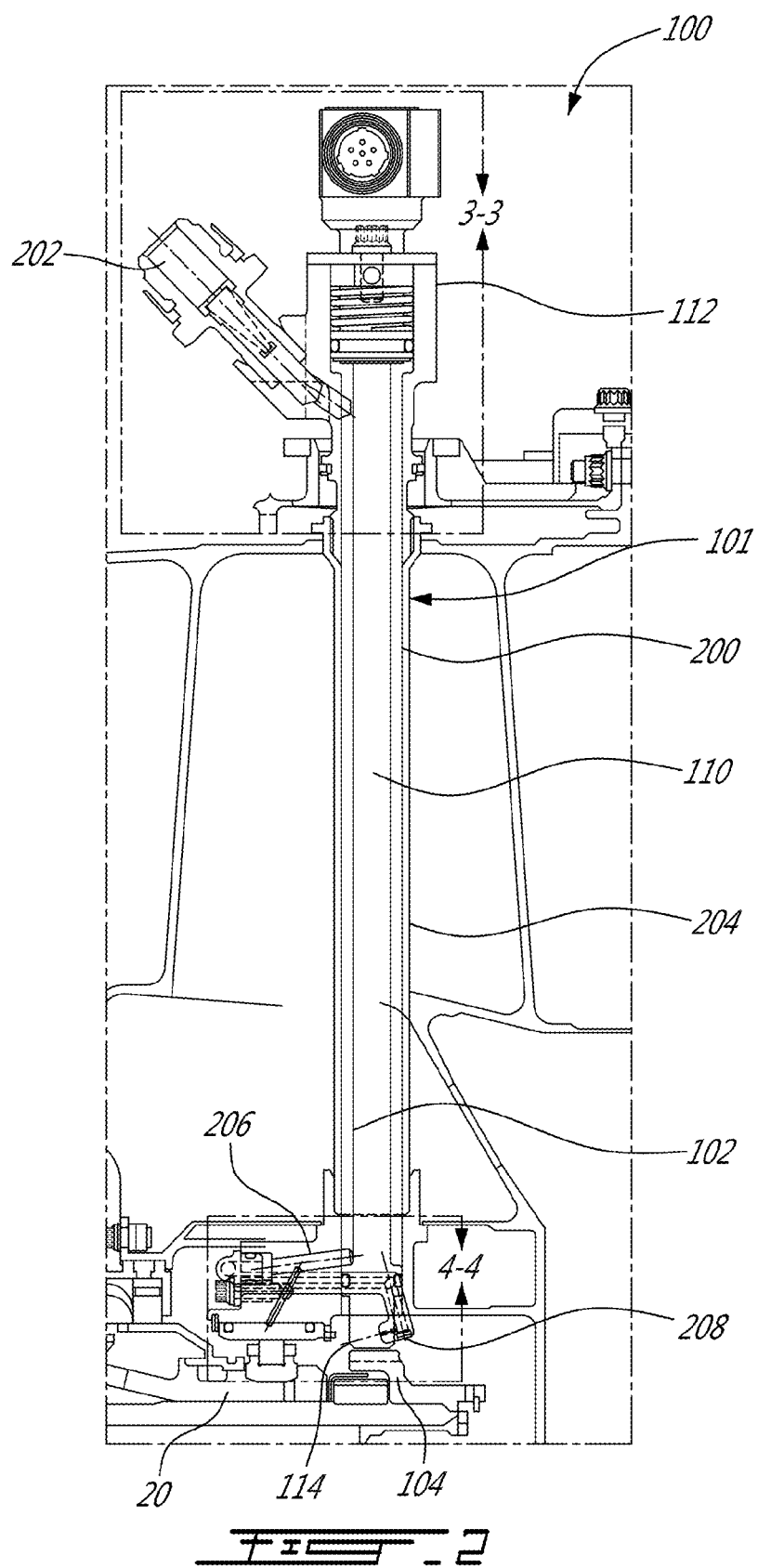
FIG. 2 is a close up view of the hot section module of FIG. 2 showing an electric probe assembly.
Figure 3:
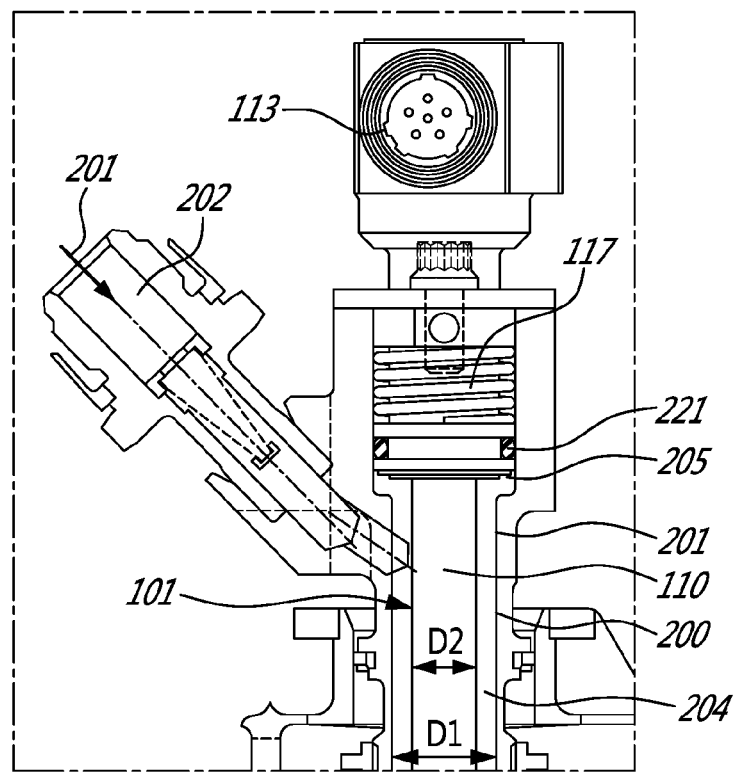
FIG. 3 is a close-up view of an upper portion of the electric probe assembly of FIG. 2.
Figure 4:
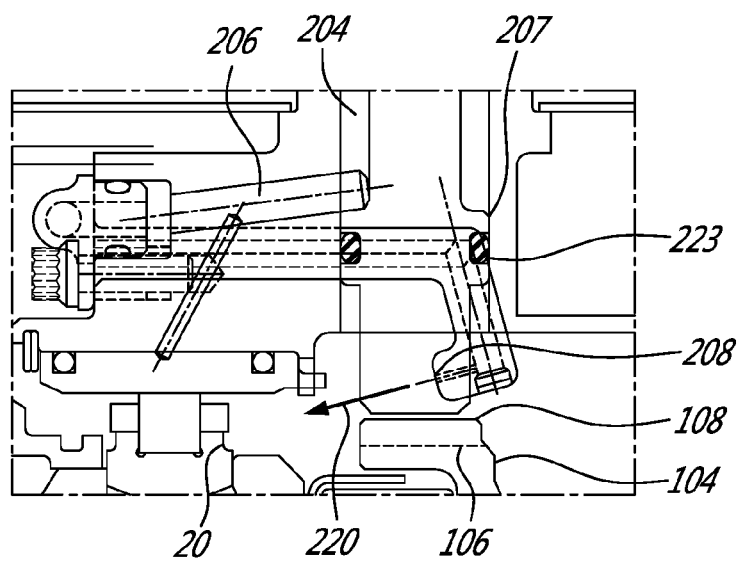
FIG. 4 is a close-up view of a lower portion of the electric probe assembly of FIG. 2.

Referring to FIGS. 2 to 4, the electric probe assembly 100 includes an electrical probe 101 and a conduit 200 embedding a portion of the electrical probe 101 in lubricating oil. The lubricating oil has a temperature lower than a local ambient temperature. The local ambient temperature is the temperature of the air in the vicinity of the electrical probe assembly 100, i.e. the temperature of an immediate environment around the electric probe assembly 100. The conduit 200 flows relatively cold oil compared to the hot local ambient temperature of the hot section module 2 around the electrical probe assembly 100, and acts as an insulant to the electric probe 101. The conduit 200 will be described below.

The electric probe 101 determines a speed of rotation of the turbine 18. The electrical probe 101 is connected to a control unit (not shown) which shuts the engine 10 down a variation of the speed of the turbine 18 is higher than a predetermined value. This speed limitation allows avoiding permanent damages to the engine 10. It is contemplated that the turbine section 18 could have only one or more than two electrical probe assemblies 100. It is also contemplated that the electrical probe 101 could shut the engine 10 off based on predetermined speed values other than described herein.

The electrical probe 101 includes a stator portion 102 and a rotor portion 104. In normal conditions of operation, the stator portion 102 and the rotor portion 104 are facing each other without contacting each other. The stator portion 102 is fixed relative to the engine case 15, while the rotor portion 104 is movable relative to the engine case 15. The stator portion 102 is disposed perpendicular to the longitudinal axis 11 and extends from the hot section module 2 to an exterior of the hot section module 2. It is contemplated that the entire stator portion 102 could be contained in the hot section module 2. The rotor portion 104 is disposed at proximity of the longitudinal axis 11 in the hot section module 2. It is contemplated that the rotor portion 104 could be disposed elsewhere in the engine 10.

The rotor portion 104 is circular and includes a plurality of recesses 106 (one being shown in phantom in FIG. 4) and raises 108 (only one being shown in FIG. 4). Each of the plurality of raises 108 is covered by a magnet (not shown) of sign opposite to a magnet of the stator portion 102 (not shown), such that the stator portion 102 may be able to detect two consecutive magnets of the rotor portion 104. Detection of consecutive magnets of the rotor portion 104 allows the control unit determining a speed of the turbine 18 based on a time elapsed between the two consecutive magnets. It is contemplated that the magnets of the rotor portion 104 could be disposed on the recesses 106 instead of on the raises 108. It is also contemplated that the electric probe 101 could read a speed of the turbine 18 without using magnets. For example, the detection could be visual using a laser.

The stator portion 102 includes an elongated cylindrical body 110. It is contemplated that the body 110 could not be cylindrical and/or could not be elongated. For example, the body 110 could have a square cross-section. The body 110 is made of metal and extends from a first end 112 disposed outside the hot section module 12, to a second end 114 disposed inside the turbine 18 toward the longitudinal axis 11. The second end 114 faces the rotor section 104, and includes the magnet compatible with the magnets of the rotor portion 104.

The first end 112 includes an electrical harness 113 to the control unit. The electrical harness 113 includes 6 pins that relay information from the electrical wires to the control unit. The electrical harness 113 may be different from illustrated herein. The first end 112 also includes an optional spring 117. The spring 117 allows absorbing some vertical motion of the body 110 should it be moved upward during a dysfunction operation. For example, should the stator portion 104 be off centered, the spring 117 would allow the body 110 to move upwardly should it be pushed upwardly by the stator portion 104.

An inside of the body 110 is hollow and includes electrical wires (not shown) that connect the magnet to the electrical harness 113. The inside of the body 110 includes a ceramic coating for thermal insulation purposes. It is contemplated that the inside of the body 110 could include an insulant other than a ceramic or could include no insulant at all.

The conduit 200 is part of the oil system that conveys lubrication oil to the engine 10. In the embodiment shown here, the oil conduit 200 is part of a pressure fluid line, where oil is accrued toward a roller bearing 20 of the engine 10 for lubricating it. The oil conduit 200 includes an inlet 202, a first section 204 fluidly communicating with the inlet 202 and surrounding the probe body 110, a second section 206 fluidly communicating with the first section 204 and carrying the oil from around the probe body 110 toward the bearing 20, and an outlet 208 fluidly communicating with the second section 206 and expulsing the oil in a jet 210 (shown in FIG. 4) to the bearing 20.

The inlet 202 is disposed at an angle with respect to the first section 204. It is contemplated that the inlet 202 could be at an angle with respect to the first section 204 different from shown in the Figures. The inlet 202 could even be aligned with the first section 204.

The first section 204 is cylindrical and hollow. An inside of the first section 204 receives the probe body 110. It is contemplated that the first section 204 could not be cylindrical. For example, the first section 204 could be square. The first section 204 has a sidewall 201 having a diameter D1. The diameter D1 is larger than a diameter D2 of the probe body 110 so that the first section 204 surrounds the probe body 110. The probe body 110 does not contact with inner walls of the sidewall 201 so that oil can effectively surround sides of the probe body 110. Contact of the probe body 110 with the flowing oil contained in the first section 204 of the conduit 200 favors thermal communication between the oil of the conduit 200 and the electric probe 101. As such, the first section 204 acts as a thermal shield for the electric probe 101. Those sections of the electric probe 101 embedded in the oil (in the present example, the probe body 110) acquire a temperature of the oil (in the present example, 280 degrees Fahrenheit) and will be shielded from the local ambient temperature of the turbine 18 (in the present example, 1200 degrees Fahrenheit) around the electrical probe assembly 100. With this configuration, the probe body 110 does not need additional insulant to shield against the hot local ambient temperature. It is contemplated however, that the probe body 110 could have an additional insulant.

An upper end 205 of the first section 204 is sealed by an O-ring seal 221, and a lower end 207 of the first section 204 is sealed by an O-ring seal 223. The second section 206 connects to the lower end 207 of the first section 204 and receives the oil that has flow through the first portion 204.

Insulation of the electrical probe assembly 100 is as follows. The oil is first introduced in the inlet 202 (arrow 201). The oil system being pressurised, oil flows through the first section 204 whatever orientation of the engine 10. As the oil flows through the first section 204, it exchanges energy with the probe body 110 disposed in the first section 204. The oil coming from the cold section 1 of the engine 10, it has a significant lower temperature compared to the local ambient air around the electrical probe assembly 100. The electric probe 101 which may be heated by the ambient air of the hot section module 2 is cooled down by the fluid flowing through the first portion 204. The oil exist the first portion 204 and flows through the second portion 206. In the second portion 206, the oil may have a temperature higher than at the inlet 202 due to the thermal transfer occurred in the first section 204. This higher temperature should not impair the lubricant properties of the oil. The second section 206 carries the oil from the first portion 204 to the outlet 208 disposed facing the bearing 20 to be lubricated. The oil is delivered to the bearing 20 as a jet (see arrow 220). It is contemplated that the oil could lubricate components of the engine 10 other than the bearing 20. For example, the conduit 200 could carry oil to a ball bearing, a sleeve or a bushing for lubrication.

The above description is meant to be exemplary only, and one skilled in the art will recognize that changes may be made to the embodiments described without departing from the scope of the invention disclosed. For example, the electric probe described herein is only one example of electric probe that may be insulated by a fluid at a temperature lower than a local ambient temperature around the probe assembly, and other types of electric probes are contemplated. These may or may not have a rotor portion. The fluid may not be lubrication oil, as long as it has a temperature lower than the local ambient temperature around the probe assembly and that this temperature allows the electric probe to function. The electric probe is shown herein as being surrounded by oil coming from an oil supply line, but it is contemplated that the electric probe could be surrounded by oil of an oil return line instead. The electric probe may be surrounded by oil that may not be used to lubricate a component of the engine. It is also contemplated that the fluid surrounding the electric probe at a temperature lower than the local ambient temperature around the probe assembly could be a liquid other than oil. It could also be a gas or be a mixture of a liquid and a gas. For example, in cases where the electric probe is embedded in a vent line, oil vapor could be found in addition to oil in the vent lines. Also, the electric probes insulated by the fluid, as described above, could be disposed in areas of the hot section module of the engine other than the turbine. Although the electric probe assembly has been described herein for a hot section module of a gas turbine engine, it is contemplated that the electric probe assembly could be used in other contexts not related to a gas turbine engine as long as the fluid flowing around the electric probe is at a temperature lower than the local ambient temperature around the probe assembly. With the above assembly, one do not need to re-design the electric probe for use in the hot section module of the gas turbine engine, one may just use an off-the-shelf electric probe. Still other modifications which fall within the scope of the present invention will be apparent to those skilled in the art, in light of a review of this disclosure, and such modifications are intended to fall within the appended claims.

The invention claimed is:

1. A gas turbine engine comprising:
a hot section module including:
at least one electric speed probe assembly surrounded by an immediate environment having a local ambient temperature, the at least one electric probe assembly including:
a turbine rotation speed probe having a probe body; and
a conduit surrounding at least a portion of the probe body, in operation, the conduit carrying a fluid flowing at a temperature lower than the local ambient temperature, the at least portion of the probe body being embedded in the fluid inside the conduit, the fluid thermally insulating the probe body from the local ambient temperature of the immediate environment around the at least one electric speed probe assembly.

2. The gas turbine engine as defined in claim 1, wherein the probe body and the conduit is elongated and cylindrical.

3. The gas turbine engine as defined in claim 2, wherein the fluid is lubricating oil, the conduit connects to an outlet, and the outlet delivers lubricating oil to a component of the gas turbine engine.

4. The gas turbine engine as defined in claim 1, wherein the fluid is a liquid.

5. The gas turbine engine as defined in claim 1, wherein the local ambient temperature of the immediate environment around the at least one electric speed probe assembly is above 1000 degrees Fahrenheit, and the temperature of the fluid is below 400 degrees Fahrenheit.

6. The gas turbine engine as defined in claim 1, wherein the at least one electric speed probe includes a stator portion and a rotor portion, the rotor portion being movable relative to the stator portion, the stator portion including the probe body.

7. The gas turbine engine as defined in claim 1, wherein the probe body is hollow and includes electrical connections therein.

8. The gas turbine engine as defined in claim 1, wherein the at least one electrical speed probe is disposed in a turbine section of the hot section module.

9. The gas turbine engine as defined in claim 1, wherein the fluid is a sole insulant of the at least one electric speed probe.

10. The gas turbine engine as defined in claim 1, wherein the conduit is part of an oil supply line of the engine.

11. The gas turbine engine as defined in claim 1, wherein the probe body includes a ceramic insulant.

12. An electric probe assembly for use in an environment having a local ambient temperature immediately around the probe assembly, the assembly comprising:
an electric probe having a probe body having a first radial dimension; and
a conduit having a second radial dimension larger than the first radial dimension, the conduit containing at least a portion of the probe body, the conduit being adapted to carry a fluid flowing at a temperature lower than the local ambient temperature immediately around the probe assembly, the at least portion of the probe body being embedded in the fluid, the fluid thermally insulating the at least portion of the probe body from the local ambient temperature, and wherein the electric probe has a stator portion and a rotor portion, the rotor portion being movable relative to the stator portion, the stator portion including the probe body.

13. The electric probe assembly defined in claim 12, wherein the electric probe is a turbine rotation speed probe.

14. The electric probe assembly defined in claim 13, wherein the turbine rotation speed probe extends into an oil cavity of a turbine section.

15. A method of operating an electric speed probe in a turbine section of a hot section module of a gas turbine engine, the method comprising:
measuring a rotation speed of a turbine rotor with the electric speed probe;
carrying oil at a temperature lower than a local ambient temperature immediately around the electric speed probe in an oil cavity surrounding at least a portion of the electric speed probe with the oil; and
thermally insulating the portion of the electric speed probe from the local ambient temperature as a result of carrying the oil in the oil cavity.

16. The method of claim 15, wherein the electric speed probe comprises a rotor portion.

* * * * *